United States Patent
Tsao

(10) Patent No.: US 6,708,091 B2
(45) Date of Patent: Mar. 16, 2004

(54) AUTOMATED TERRAIN AWARENESS AND AVOIDANCE SYSTEM

(76) Inventor: Steven Tsao, 2948 Cropley Ave., San Jose, CA (US) 95132

( * ) Notice: Subject to any disclaimer, the term of this patent is extended or adjusted under 35 U.S.C. 154(b) by 0 days.

(21) Appl. No.: 10/159,582

(22) Filed: May 31, 2002

(65) Prior Publication Data

US 2003/0225489 A1 Dec. 4, 2003

(51) Int. Cl.[7] .................................................. G08G 5/00
(52) U.S. Cl. ............................ 701/9; 701/3; 701/120; 701/301; 340/945; 340/983
(58) Field of Search ................................. 701/3, 4, 9, 10, 701/14, 120, 301; 244/76 R; 340/945, 983, 977; 342/65

(56) References Cited

U.S. PATENT DOCUMENTS

| | | | |
|---|---|---|---|
| 2,382,557 A | * | 8/1945 | Frazier ........................ 340/983 |
| 5,381,338 A | | 1/1995 | Wysocki et al. |
| 5,839,080 A | | 11/1998 | Muller et al. |
| 5,892,462 A | | 4/1999 | Tran |
| 5,945,926 A | | 8/1999 | Ammar et al. |
| 6,088,634 A | | 7/2000 | Muller et al. |
| 6,122,570 A | | 9/2000 | Muller et al. |
| 6,133,867 A | * | 10/2000 | Eberwine et al. ............. 342/29 |
| 6,138,060 A | | 10/2000 | Conner et al. |
| 6,219,592 B1 | | 4/2001 | Muller et al. |
| 6,275,697 B1 | * | 8/2001 | King et al. ............... 455/432.1 |
| 6,292,721 B1 | | 9/2001 | Conner et al. |
| 6,347,263 B1 | | 2/2002 | Johnson et al. |

* cited by examiner

*Primary Examiner*—Michael J. Zanelli
*Assistant Examiner*—Eric Gibson
(74) *Attorney, Agent, or Firm*—Bever, Hoffman & Harms, LLP; E. Eric Hoffman

(57) ABSTRACT

An automated terrain awareness and avoidance system includes a transmitter located in a region to be protected from controlled flight into terrain accidents. The transmitter transmits an identification value to an aircraft. In response, a safety checking routine on the aircraft identifies a danger zone around the transmitter, and determines whether the aircraft has (or will) enter the danger zone. If the safety checking routine determines that the aircraft has (or will) enter the danger zone, the safety checking routine determines a safe route and engages the autopilot, which steers the aircraft along the safe route. The safety checking routine also causes a password to be transmitted to an air route traffic control center (ARTCC). The autopilot is disengaged if the safety checking routine determines the aircraft is no longer on course to enter the danger zone, or when the password, which must be received from the ARTCC, is entered.

31 Claims, 8 Drawing Sheets

AUTOMATED TERRAIN AWARENESS AND AVOIDANCE SYSTEM

FIELD OF THE INVENTION

The present invention relates to a system to reduce or eliminate accidents whereby an airplane is flown, either deliberately or unintentionally, into ground, water or other obstacles.

RELATED ART

Controlled flight into terrain—known in the aviation community by the acronym "CFIT" (pronounced "See-fit")—is the leading cause of fatal commercial air accidents worldwide. In CFIT accidents, a fully qualified and certificated crew flies a properly working airplane into the ground, water or obstacles with no apparent awareness by the pilots. Worse yet, as evident in the 9-11 attacks, an aircraft may even be hijacked and deliberately flown into a building/ terrain to cause fatalities among both the passengers and ground civilians.

Certain systems are currently available to address unintentional CFIT accidents. These systems are typically variations of either the Terrain Awareness and Warning System (TAWS) or Collision Avoidance System (CAS). TAWS and CAS use radar to detect terrain and other aircraft located within a certain proximity of the aircraft. Upon detecting the presence of terrain or other aircraft, a warning signal is provided to the pilot, who must then analyze the warning and determine whether to take evasive action. These systems vary in their sophistication on how to detect dangers in front of the plane. However all systems share some similar drawbacks.

First, the conventional systems are very expensive. This makes it almost prohibitive to install such systems on small planes. Regardless of how good a system is, it is useless if it is not installed.

Second, the conventional systems provide warnings only. As a result, these systems depend on a crew present in the aircraft to notice and react to the warning. In cases where the crew is incapacitated or the plane has been hijacked, one can assume that the person in control of the plane probably has malicious intentions. In these cases, no amount of warning will suffice.

It would therefore be desirable to have an inexpensive system that provides for automatic awareness and avoidance of flight into terrain.

SUMMARY

Accordingly, the present invention provides an Automated Terrain Awareness and Avoidance System (ATAAS), which addresses both the shortcomings of the systems discussed above.

In one embodiment, the ATAAS includes a location transmitter located in a region to be protected from CFIT accidents. For example, the location transmitter may be located on top of a tall building. The transmitter transmits an identification value to an aircraft. In one embodiment, the identification value includes the 3-D location of the location transmitter and a tag identifier value.

Upon receiving the identification value, a safety checking routine on the aircraft identifies a danger zone around the transmitter, and determines whether the aircraft has entered (or is on course to enter) the danger zone. If the safety checking routine determines that the aircraft has (or will) enter the danger zone, the safety checking routine determines a safe route and engages the autopilot, which automatically steers the aircraft along the safe route. The safety checking routine also causes a random password to be transmitted to an air route traffic control center (ARTCC). The autopilot is only disengaged if the safety checking routine determines the aircraft is no longer on course to enter the danger zone, or if the crew obtains the random password from the ARTCC, and provides this random password to the safety checking routine.

In another embodiment, the ATAAS can be configured to receive an alarm signal from a Terrain Awareness and Warning System (TAWS) or Collision Avoidance System (CAS) on the aircraft. Upon receiving the alarm signal, the safety checking routine determines a safe route and engages the autopilot, which automatically steers the aircraft along the safe route. The safety checking routine also causes a random password to be transmitted to an air route traffic control center (ARTCC). The autopilot is only disengaged if the safety checking routine determines the TAWS or CAS is no longer asserting the alarm signal, or if the crew obtains the random password from the ARTCC, and provides this random password to the safety checking routine.

In yet another embodiment, the ATAAS can be configured to receive a manual alarm signal when someone in the cockpit actuates a manual alarm switch. It is expected that such a manual alarm switch would be actuated in the event that the aircraft was being hijacked. Upon receiving the manual alarm signal, the safety checking routine determines a safe route and engages the autopilot, which automatically steers the aircraft along the safe route. The safety checking routine also causes a random password to be transmitted to an air route traffic control center (ARTCC). The autopilot is only disengaged if the someone on the aircraft obtains the random password from the ARTCC, and provides this random password to the safety checking routine.

The present invention will be more fully understood in view of the following description and drawings.

DETAILED DESCRIPTION

Figure 1:
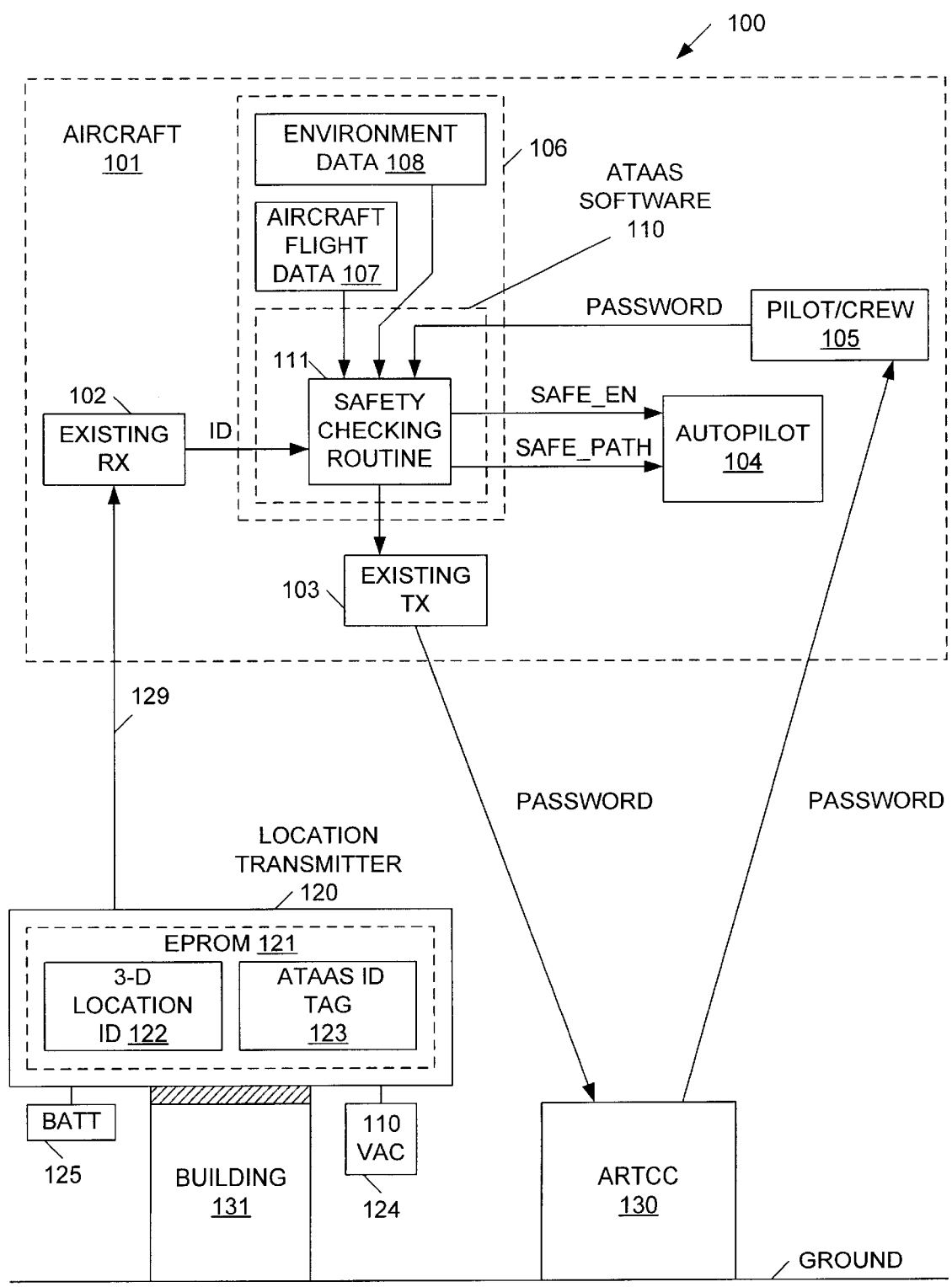
FIG. 1 is a block diagram of an automated terrain awareness and avoidance system (ATAAS) that implements one or more location transmitters in accordance with one embodiment of the present invention.

FIG. 1 is a block diagram of an automated terrain awareness and avoidance system (ATAAS) 100 in accordance with one embodiment of the present invention. ATAAS 100 includes an aircraft 101, a location transmitter 120, and an air route traffic control center (ARTCC) 130. In the described embodiment, location transmitter 120 is located on top of a tall building 131, although this is not necessary. Aircraft 101 includes aviation signal receiver 102, aviation signal transmitter 103, autopilot device 104, and pilot/crew 105, and aircraft data processor 106, all of which are standard elements on aircraft 101. In accordance with one embodiment of the present invention, aircraft 101 also includes ATAAS software 110, which further includes safety-checking routine 111.

Location transmitter 120 is powered by regular 120 Volt AC power supply 124 in the described embodiment. A battery backup power supply 125 is provided in the event that AC power supply 124 becomes non-functional. Battery backup power supply 124 provides additional reliability to ATAAS 100.

Location transmitter 120 includes an internal one-time programmable Electrically Programmable Read Only Memory (EPROM) 121. EPROM 121 is programmed to store a value representative of the three-dimensional (3-D) location of the transmitter. This value is hereinafter referred to as 3-D location identifier 122. EPROM 121 is also programmed to store an internal ATAAS identification tag 123, which is used to verify 3-D location identifier 122.

Because EPROM 121 can only be programmed once, it is not possible for someone to subsequently reprogram the values originally stored in EPROM 121. This advantageously helps to prevent sabotage of ATAAS 100.

In the described embodiment, location transmitter 120 transmits the 3-D location-identifier 122 and ATAAS identification tag 123 in all directions using standard aviation radio signals 129. For example, signals 129 can be transmitted using the conventional controller-pilot data link communication (CPDLC) channel. In one embodiment, location transmitter 120 has a transmission radius of no less than 20 nautical miles, in order to ensure that the signals 129 reach aircraft 101 in time to allow aircraft 101 to take evasive action, as described in more detail below. In the described embodiment, location transmitter 120 encrypts the 3-D location identifier 122 and ATAAS identification tag 123 prior to transmitting these values.

In one embodiment, location transmitter 120 continuously transmits 3-D location identifier 122 and ATAAS identification tag 123. In another embodiment, location transmitter 120 periodically transmits 3-D location identifier 122 and ATAAS identification tag 123 at predetermined times (e.g., once every 30 seconds).

When aircraft 101 enters the transmission radius of location transmitter 120, receiver 102 on aircraft 101 will receive and decrypt the transmitted 3-D location identifier 122 and ATAAS identification tag 123. Because receiver 102 is a conventional element already found all aircraft 101, there is no significant additional cost involved with receiving the signals 129 transmitted by location transmitter 120.

Receiver 102 is configured to forward 3-D location identifier 122 and ATAAS identification tag 123 to safety checking routing 111 of ATAAS software 110. Upon detecting ATAAS identification tag 123, safety checking routine 111 extracts 3-D location identifier 122. At this time, safety checking routing 111 obtains the 3-D location of location transmitter 120.

Figure 2A:
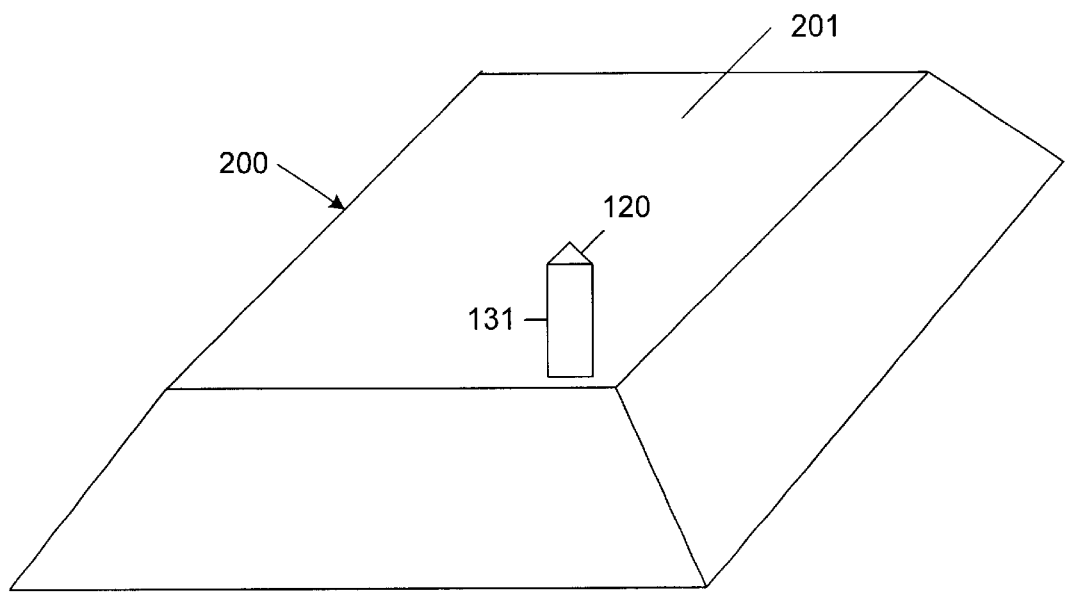
FIG. 2A is a schematic diagram of a 3-D trapezoidal danger zone around a location transmitter of the ATAAS of FIG. 1 in accordance with one embodiment of the present invention.
Figure 2B:
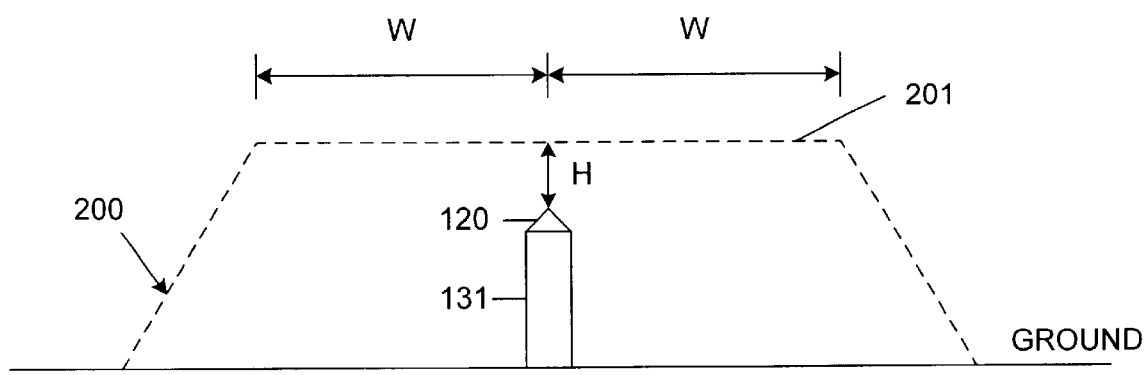
FIG. 2B is a 2-dimensional diagram of the trapezoidal danger zone of FIG. 2A around the location transmitter.

Safety checking routine 111 is programmed to define a 3-D danger zone around the received 3-D location. FIG. 2A is a schematic diagram of a 3-D trapezoidal danger zone 200 around location transmitter 120 in accordance with one embodiment of the present invention. FIG. 2B is a 2-dimensional diagram of trapezoidal danger zone 200 around location transmitter 120. The upper surface 201 of trapezoidal danger zone 200 extends a height "H" of about 500 meters above location transmitter 120. Each of the edges of upper surface 201 is located at a width W of about 1000 meters laterally adjacent to location transmitter 120. The illustrated danger zone 200 is exemplary only. It is understood that the present invention can be implemented using danger zones of other shapes and dimensions in accordance with other embodiments of the present invention. However, the trapezoidal danger zone 200 may provide advantages, which are described in more detail below.

Safety checking routine 111 is also configured to receive flight data 107 concerning the velocity, position, and path of aircraft 101, and environment data 108 concerning obstacles around aircraft 101 (e.g., other aircraft or mountains). This flight data 107 and environment data 108 is obtained from conventional measurement apparatus, and is normally available in aircraft data processor 106. Safety checking routine 111 uses flight data 107 to determine whether aircraft 101 has entered danger zone 200, or whether aircraft 101 will enter danger zone 200 if aircraft 101 maintains the present course. If safety checking routine 111 determines that aircraft 101 is either in danger zone 200, or on a course to enter danger zone 200, then safety checking routine 111 activates a safety enable (SAFE_EN) signal. The activated SAFE_EN signal is applied to autopilot 104, thereby engaging autopilot 104. Using the flight data 107 and the environment data 108, safety checking routine 111 also determines a safe path for aircraft 101 to avoid danger zone 200, and transmits this safe path (SAFE_PATH) to autopilot 104. Once engaged, autopilot 104 causes aircraft 101 to perform a controlled climb along the safe path, out of the range of danger zone 200. In this manner, aircraft 101 is prevented from colliding with buildings or other structures within danger zone 200.

Note that the trapezoidal shape of danger zone 200 advantageously allows more distance for a low-flying aircraft to climb over building 131, if the aircraft 101 is approaching along the base of the 3-D trapezoidal region.

Once autopilot 104 has been engaged by the activated SAFE_EN signal, autopilot 104 can be disengaged in one of two manners. First, safety checking routine 111 continues to receive aircraft flight data 107 and environment data 108. If safety checking routine 111 determines that aircraft 101 is no longer in danger zone 200, or is no longer on course to enter danger zone 200, then safety checking routine de-activates the SAFE_EN signal, thereby de-activating autopilot 104 and returning control of aircraft 101 to pilot/crew 105.

Autopilot 104 can alternately be disengaged in the following manner. Upon determining that aircraft 101 is either in danger zone 200, or on course to enter danger zone 200, safety checking routine 111 randomly generates and stores a password. Safety checking routine 111 also encrypts this password, and causes aircraft transmitter 103 to transmit the encrypted password to ARTCC 130. This password can be used to disengage autopilot 104, after autopilot 104 has been engaged by the SAFE_EN signal. After the personnel in ARTCC 130 have determined that it is acceptable for aircraft 101 to be removed from autopilot 104 (i.e., after aircraft 101 is out of harms way), ARTCC 130 may transmit the password to pilot/crew 105, who manually enters the password to regain control of aircraft 101. More specifically, the password is provided to safety checking routine 111, via an input device (e.g., keyboard) of aircraft data processor 106. Safety checking routine 111 compares the previously stored password with the password entered by pilot/crew 105. Upon detecting a match, safety checking routine 111 de-activates the SAFE_EN signal. Upon receiving the de-activated SAFE_EN signal, autopilot 104 disengages, thereby returning control to pilot/crew 105.

In the foregoing manner, ATAAS 100 prevents aircraft 101 from being flow into danger zone 200, either deliberately or unintentionally.

Figure 3:
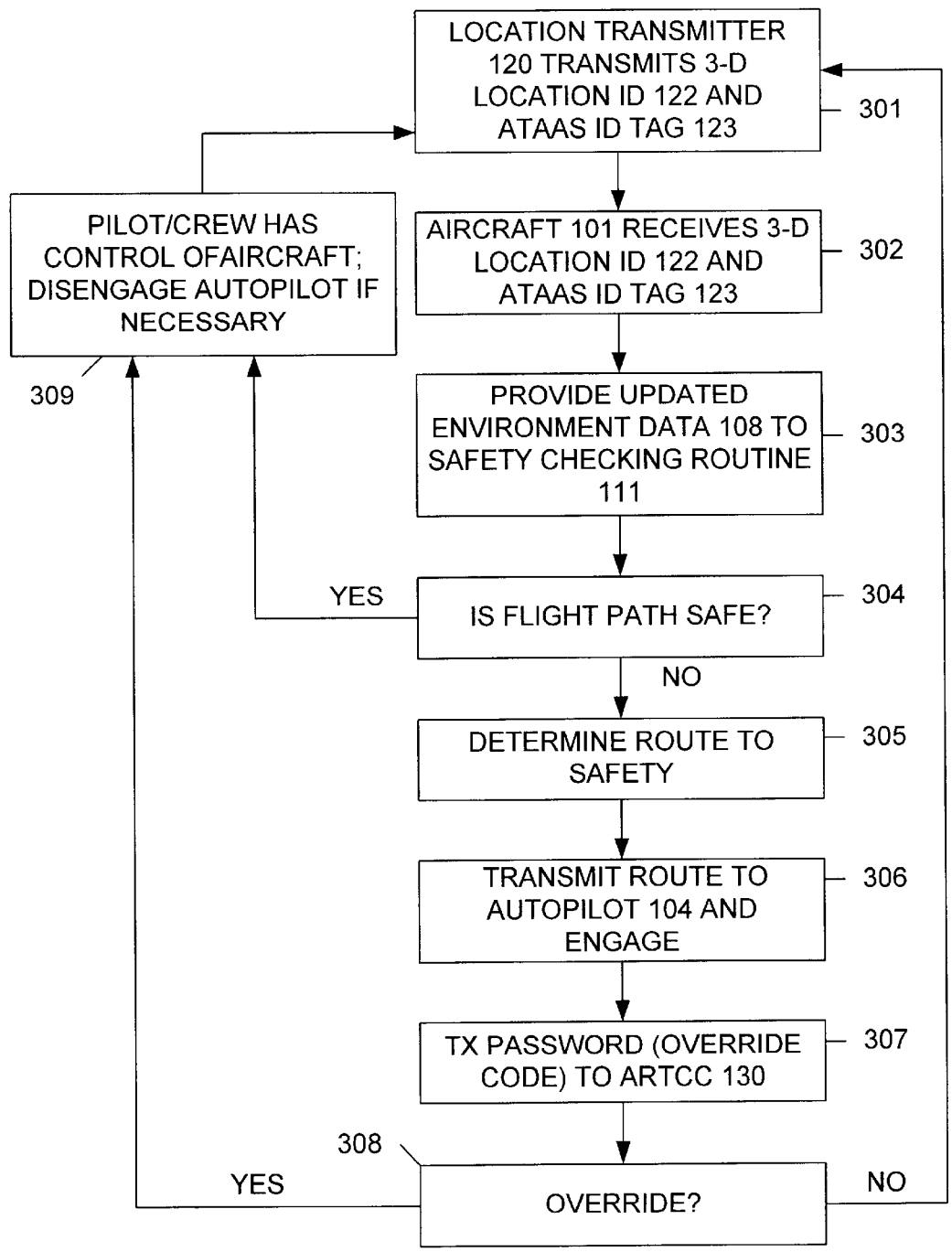
FIG. 3 is a flow diagram illustrating the process steps used by the ATAAS of FIG. 1 in accordance with one embodiment of the present invention.

FIG. 3 is a flow diagram illustrating the process steps used by ATAAS 100 in accordance with one embodiment of the present invention. Thus, in Step 301, location transmitter 120 transmits the 3-D location ID 122 and ATAAS ID tag 123. Aircraft 101 receives these values in Step 302. In Step 303, safety checking routine 111 receives updated environment data 108. Safety checking routine 111 then determines whether the current flight path is safe with respect to the danger zone 200 (Step 304). If the flight path is safe (Step 304, Yes branch), pilot/crew 105 has control of aircraft 101, and processing returns to Step 301. If the flight path is not safe (Step 304, No branch), safety checking routine 111 determines a route to safety, taking into account flight data 107, environment data 108 and danger zone 200 (Step 305). Safety checking routine 111 activates the SAFE_EN signal and transmits the route to safety to autopilot 104 (Step 306). Safety checking routine 111 generates the password/override code, which is transmitted to ARTCC 130 (Step 307). If pilot/crew-105 enters the password to override autopilot 104 (Step 308, Yes branch), safety checking routine 111 returns control of aircraft 101 to pilot/crew 105 (Step 309). If pilot/crew 105 does not enter the password to override autopilot (Step 308, No branch), processing returns to Step 301. If safety checking routing 111 determines that the flight path is safe in Step 304, then autopilot 104 is disengaged (Step 309), thereby returning control of aircraft 101 to pilot/crew 105. Processing then returns to Step 301.

Figure 4:
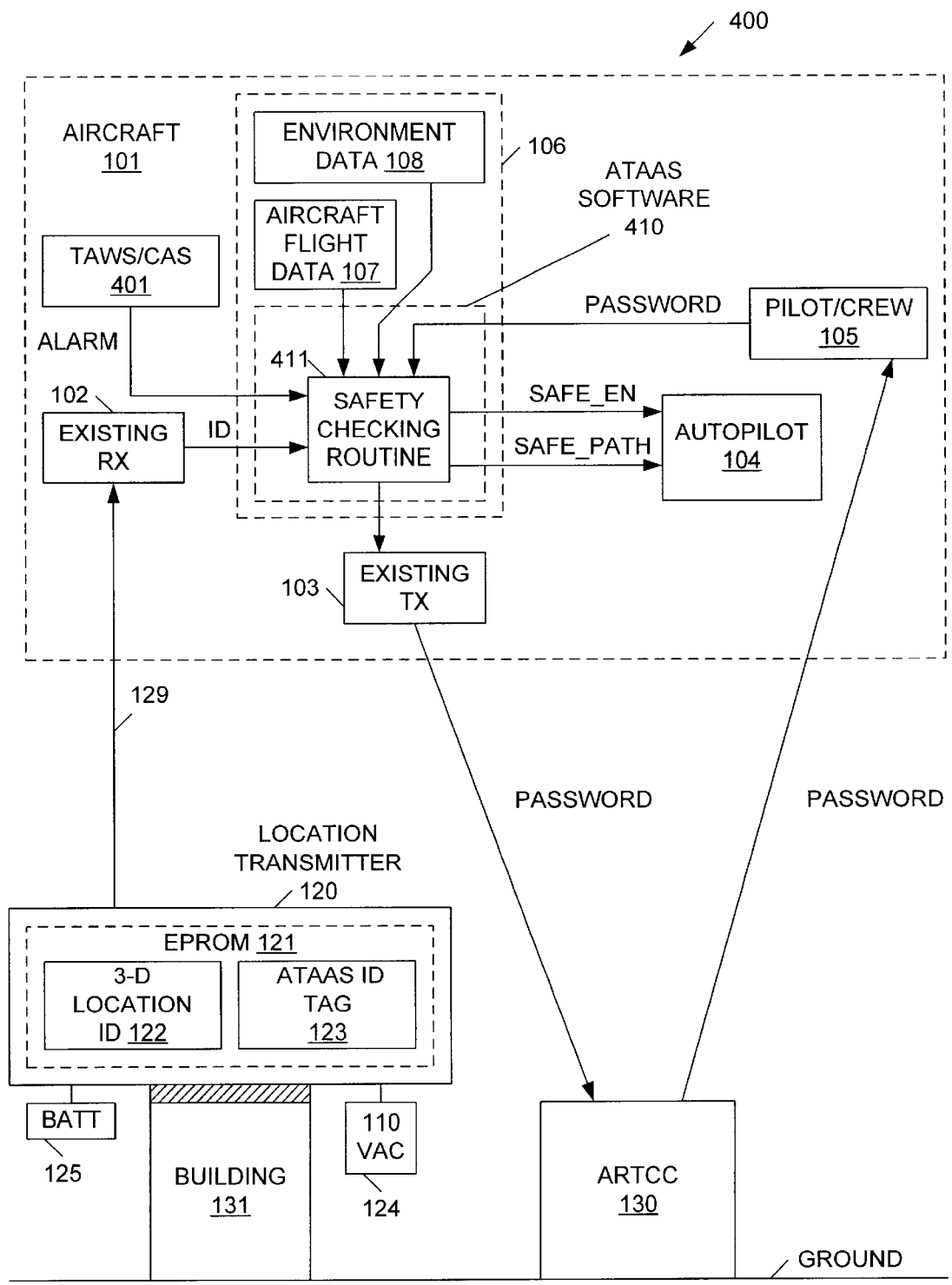
FIG. 4 is a block diagram of an ATAAS that implements a TAWS/CAS system in accordance with another embodiment of the present invention.

FIG. 4 is a block diagram of an automated terrain awareness and avoidance system (ATAAS) 400 in accordance with another embodiment of the present invention. Because ATAAS 400 is similar to ATAAS 100, similar elements in FIGS. 1 and 4 are labeled with similar reference numbers. In addition to the elements of ATAAS 100, ATAAS 400 includes existing onboard Terrain Awareness and Warning System (TAWS) or Collision Avoidance System (CAS) (TAWS/CAS) 401, which is coupled to aircraft data processor 106. As known to those of ordinary skill in the art, TAWS/CAS 401 activates an alarm signal (ALARM) when the aircraft is in danger of colliding with a hazard in the path of aircraft 101, including, but not limited to such obstacles as a mountain, water, or a building. In accordance with one embodiment of the invention, the ALARM signal is provided to safety checking routine 411 of ATAAS software 410. Safety checking routine 411 includes all of the functionality of safety checking routine 111, plus the additional functionality described below. Upon receiving the activated ALARM signal, safety checking routine 411 activates the SAFE_EN signal, thereby enabling autopilot 104. Safety checking routine 411 also determines a safe path for aircraft 101 to avoid the obstacle detected by TAWS/CAS 401, and transmits this safe path (SAFE_PATH) to autopilot 104. In response, autopilot 104 guides aircraft 101 along the safe path, away from the detected obstacle.

Once autopilot 104 has been engaged by the activated SAFE_EN signal, autopilot 104 can be disengaged in the same manner described above for ATAAS system 100. Thus, if safety checking routine 411 determines that the aircraft 101 is no longer in danger of colliding with the obstacle detected by TAWS/CAS 401, then safety checking routine 411 de-activates the SAFE_EN signal, thereby de-activating autopilot 104 and returning control of aircraft 101 to pilot/crew 105. Safety checking routine 411 also generates a password when the SAFE_EN signal is activated. This password is transmitted to ARTCC 130. ARTCC 130 can transmit the password to pilot/crew 105, if appropriate, thereby enabling pilot/crew 105 to override autopilot 104 in the manner described above.

Although ATAAS 400 operates in response to both location transmitter 120 and TAWS/CAS 401, it is understood that in other embodiments, location transmitter 120 may be omitted, such that ATAAS 400 only operates in response to TAWS/CAS 401.

Figure 5:
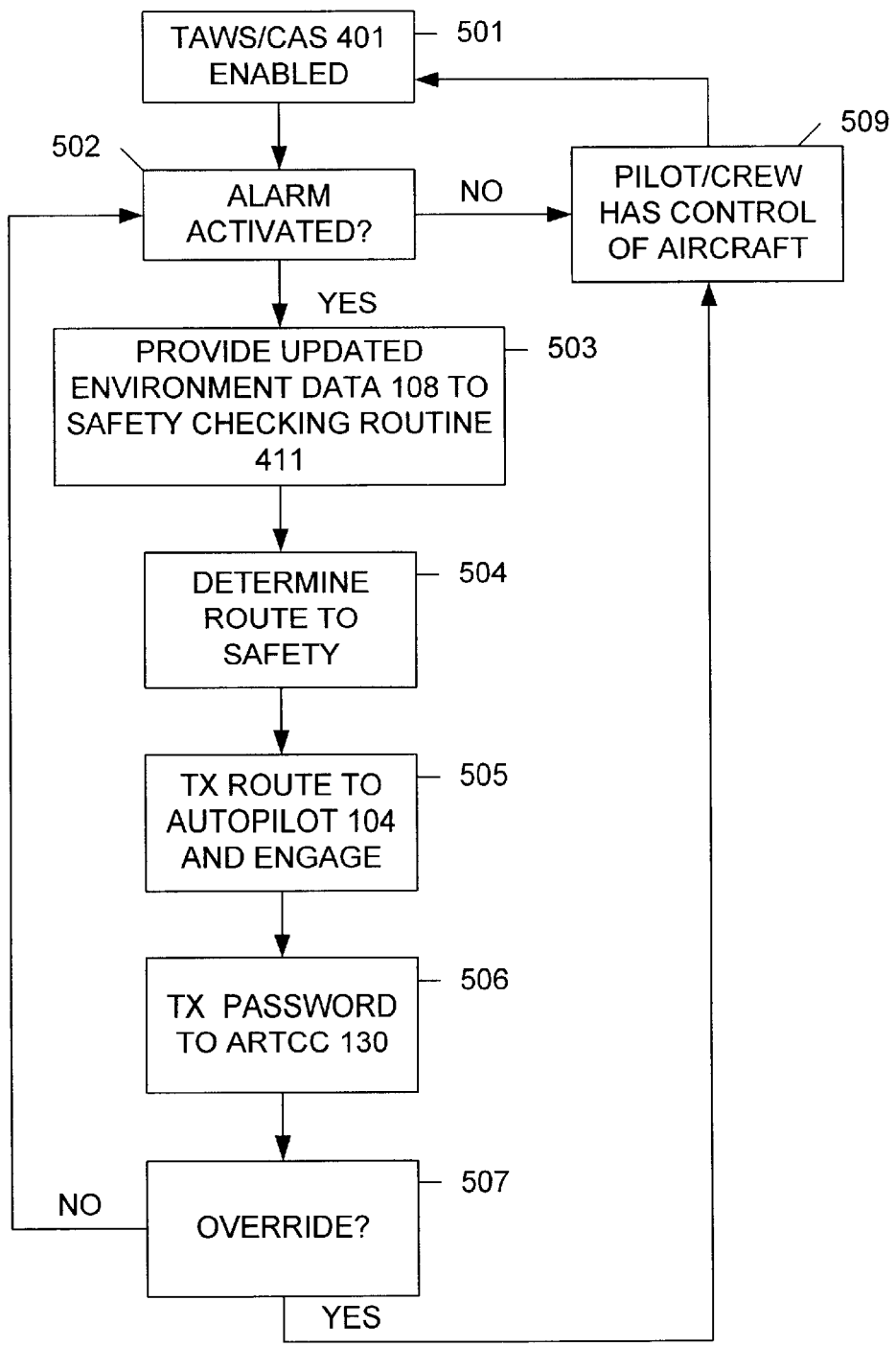
FIG. 5 is a flow diagram illustrating the process steps used by the ATAAS of FIG. 4 in accordance with one embodiment of the present invention.

FIG. 5 is a flow diagram illustrating the process steps used by ATAAS 400 to respond to a TAWS/CAS alarm in accordance with one embodiment of the present invention. Thus, in Step 501, TAWS/CAS 401 is enabled. If TAWS/CAS 401 does not activate the ALARM signal (Step 502, No branch), then pilot/crew 105 maintains control of aircraft 101 (Step 509), and processing returns to Step 501. If TAWS/CAS 401 activates the ALARM signal (Step 502, Yes branch), then safety checking routine 411 receives updated environment data 108 (Step 503). Safety checking routine 411 then determines a route to safety, taking into account flight data 107, environment data 108 and data from TAWS/CAS 401 (Step 504). Safety checking routine 411 activates the SAFE_EN signal and transmits the route to safety to autopilot 104 (Step 505). Safety checking routine 411 also generates the password/override code, which is transmitted to ARTCC 130 (Step 506). If pilot/crew 105 enters the password to override autopilot 104 (Step 507, Yes branch), safety checking routine 411 returns control of aircraft 101 to pilot/crew 105 (Step 509). If pilot/crew 105 does not enter the password to override autopilot (Step 507, No branch), processing returns to Step 502. If safety checking routing 411 determines that TAWS/CAS 401 has de-activated the ALARM signal, then autopilot 104 is disengaged (Step 502, No branch), thereby returning control of aircraft 101 to pilot/crew 105 (Step 509).

Figure 6:
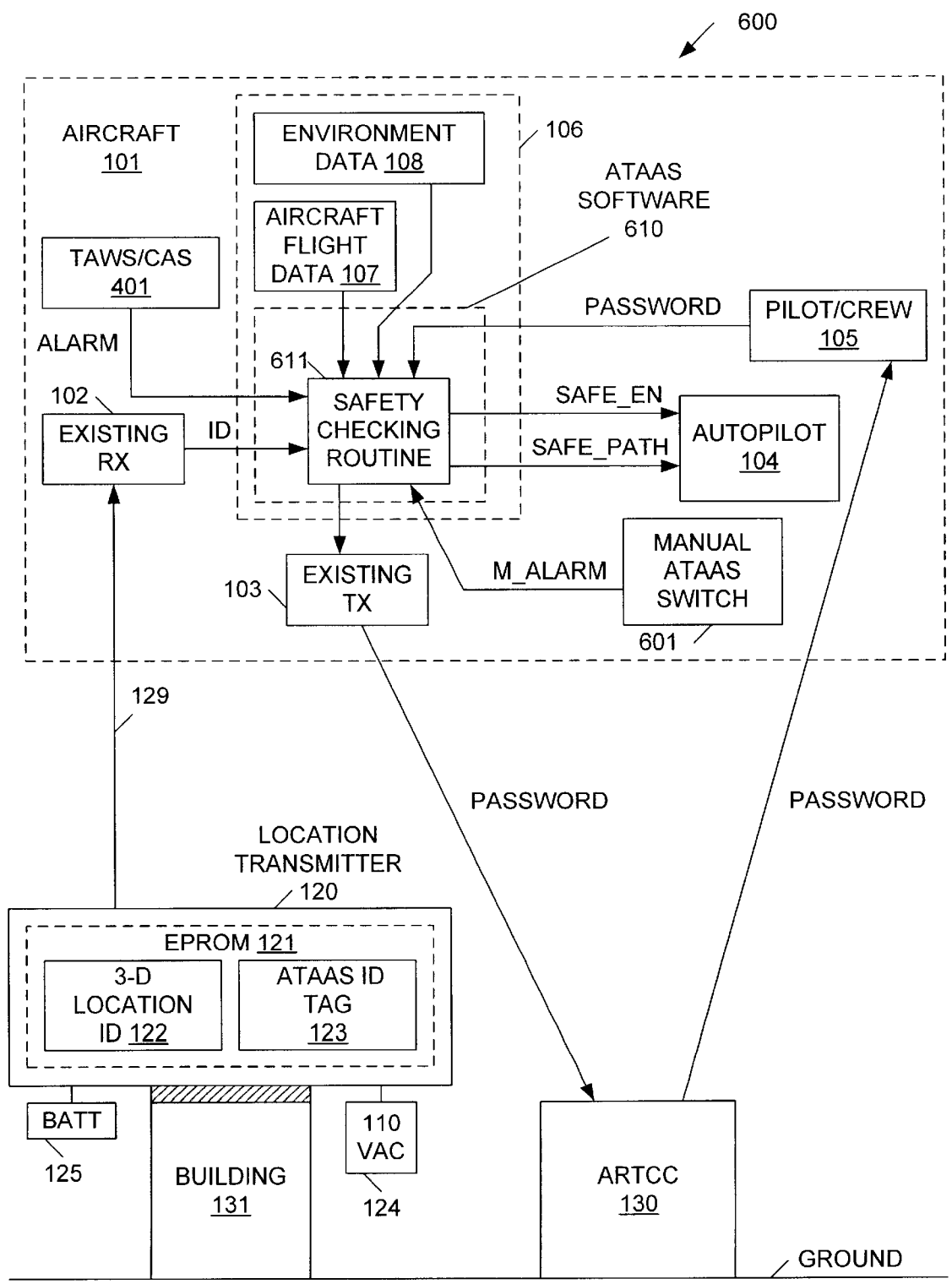
FIG. 6 is a block diagram of an ATAAS that implements a manual switch in accordance with yet another embodiment of the present invention.

FIG. 6 is a block diagram of ATAAS 600 in accordance with yet another embodiment of the present invention. Because ATAAS 600 is similar to ATAAS 400, similar elements in FIGS. 4 and 6 are labeled with similar reference numbers. In addition to the elements of ATAAS 400, ATAAS 600 includes manual ATAAS switch 601, which is coupled to aircraft data processor 106. When actuated, ATAAS switch 601 activates a manual alarm signal (M_ALARM), which is transmitted to aircraft data processor 106. It is expected that pilot/crew 105 will actuate manual switch 601 if there is a clear and present danger of aircraft 101 being hijacked.

In accordance with one embodiment of the invention, the M_ALARM signal is provided to safety checking routine 611 of ATAAS software 610. Safety checking routine 611 includes all of the functionality of safety checking routine 411, plus the additional functionality described below. Upon receiving the activated M_ALARM signal, safety checking routine 611 activates the SAFE_EN signal, thereby enabling autopilot 104. At this time, safety checking routine 611 checks the current flight data 107 and the current environment data 108, and determines whether there is any apparent danger in the current flight path. If safety checking routine 611 does not detect any apparent danger in the current flight path, then safety checking routine 611 forwards the current flight path to autopilot 104 as the SAFE__PATH. If safety checking-routine 611 detects apparent danger in the current flight path, then safety checking routine 611 determines another safe flight path, taking into account flight data 107 and environment data 108, and forwards this flight path to autopilot 104 as the SAFE__PATH. In response, autopilot 104 guides aircraft 101 along the safe path. It is important to note that ATAAS engages autopilot 104 and removes pilot/crew 105 from controlling aircraft 101 in response to the activated M__ALARM signal.

Once autopilot 104 has been engaged in response to the activated M__ALARM signal, autopilot 104 can only be disengaged using the password method described above. Thus, upon receiving the activated M__ALARM signal, safety checking routine 611 randomly generates and stores a password, which is transmitted to ARTCC 130. This password can be used to disengage autopilot 104, after autopilot 104 has been engaged by the SAFE__EN signal. After the personnel in ARTCC 130 have determined that it is acceptable for aircraft 101 to be removed from autopilot 104 (i.e., after aircraft 101 is out of harms way), ARTCC 130 transmits the password to pilot/crew 105, who manually enters the password to regain control of aircraft 101.

Although ATAAS 600 operates in response to location transmitter 120, TAWS/CAS 401, and manual ATAAS switch 601, it is understood that in other embodiments, any combination of these elements can be used in aircraft 101. For example, smaller aircraft, which do not include TAWS/CAS 401, may operate in response to location transmitter 120 and manual ATAAS switch 601.

Figure 7:
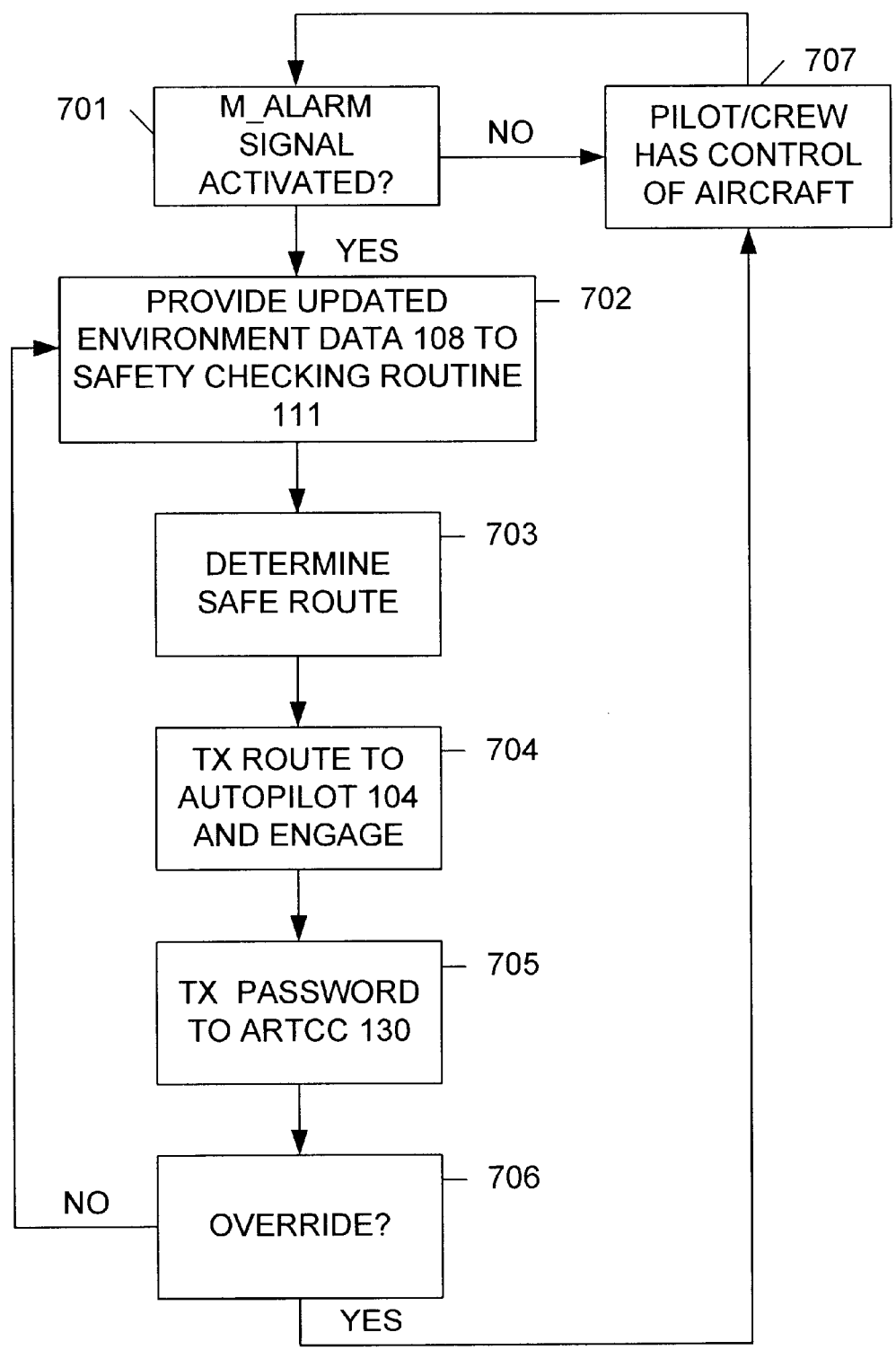
FIG. 7 is a flow diagram illustrating the process steps used by the ATAAS of FIG. 6 in accordance with one embodiment of the present invention.

FIG. 7 is a flow diagram illustrating the process steps used by ATAAS 600 to respond to the M__ALARM signal in accordance with one embodiment of the present invention. Thus, if the M__ALARM signal is not activated (Step 701, No branch), then pilot/crew 105 maintains control of aircraft 101 (Step 707), and processing returns/to Step 701. If the M__ALARM signal is activated (Step 701, Yes branch), then safety checking routine 611 receives the updated environment data 108 (Step 702). Safety checking routine 611 then determines a safe route for aircraft 101 (Step 703). Safety checking routine 611 then activates the SAFE__EN signal and transmits the safe route to autopilot 104 (Step 704). Safety checking routine 611 also generates the password/override code, which is transmitted to ARTCC 130 (Step 705). If pilot/crew 105 enters the password to override autopilot (Step 706, Yes branch), safety checking routine 611 returns control of aircraft 101 to pilot/crew 105 (Step 707). If pilot/crew 105 does not enter the password to override autopilot (Step 706, No branch), processing returns to Step 702.

Figure 8:
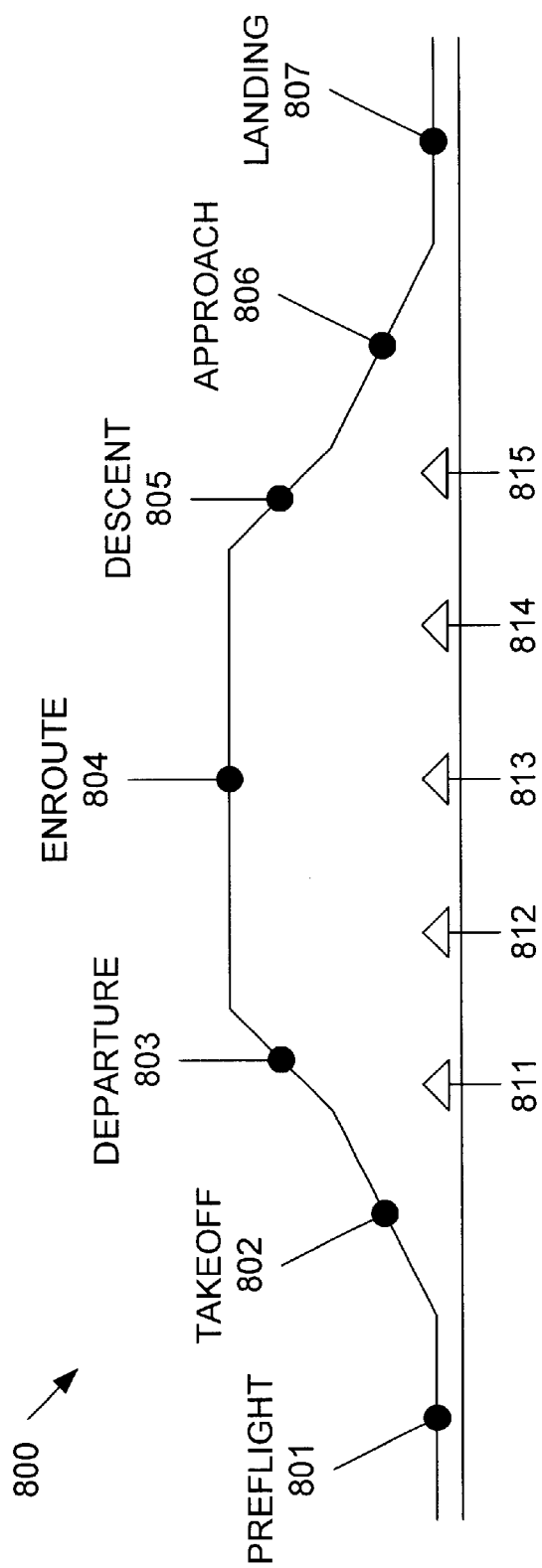
FIG. 8 is a schematic diagram illustrating the basic flight plan of an aircraft.

In accordance with another embodiment of the present invention, the ATAAS is enabled during certain parts of the flight and disabled during other parts of the flight. FIG. 8 is a schematic diagram illustrating the basic flight path 800 of aircraft 101, which includes pre-flight 801, takeoff 802, departure 803, en route 804, descent 805, approach 806 and landing 807. ARTCCs 811–815 are illustrated along flight path 800. In accordance with one embodiment, ATAAS 100 (or 400 or 600) is enabled from departure 803 to descent 805. This serves to minimize ATAAS false alarms due to spurious inputs during takeoff 802 and landing 807. In accordance with one embodiment the manual ATAAS switch 601 is enabled during all portions of flight plan 800. In other embodiments, the various ATAAS techniques may be enabled during other parts of the flight plan 800.

Advantageously, ATAAS 100 is relatively inexpensive to implement on aircraft 101. Because most of the cost of modifying aircraft 101 will be software related, the installation costs, upgrades and maintenance will be relatively inexpensive. This provides the possibility of requiring all aircraft be fitted with such a system. The design basically shifts some of the burden to the private and public sectors. Location transmitters can be added separately and individually to additional locations as deemed necessary. At the same time, since ATAAS 100 can be designed to work with existing TAWS and CAS equipment, the aircraft with this equipment may continue to see benefits from this equipment.

ATAAS 100 provides automatic hazard avoidance instead of simple warning signals. This removes the uncertainty of the crew's intention and capability from the equation. Yet ATAAS 100 is flexible enough to allow for authorized pilots to regain control of the aircraft.

Although the invention has been described in connection with several embodiments, it is understood that this invention is not limited to the embodiments disclosed, but is capable of various modifications which would be apparent to a person skilled in the art. Thus, the invention is limited only by the following claims.

What is claimed is:

1. An automated terrain awareness and avoidance system (ATAAS) comprising:
   a location transmitter located in a region to be protected from a controlled flight into terrain (CFIT) accident, wherein the location transmitter transmits an identification value; and
   an aircraft that includes;
      a receiver configured to receive the identification value transmitted by the location transmitter;
      an aircraft data processor coupled to receive the identification value from the receiver, the aircraft data processor including a safety checking routine that identifies a danger zone around the location transmitter in response to the identification value, determines whether the aircraft has entered the danger zone, or is on course to enter the danger zone, and generates a password upon determining that the aircraft has entered the danger zone, or is on course to enter the danger zone;
      a transmitter configured to transmit the password to an air route traffic control center (ARTCC); and
      an autopilot, which is engaged by the safety checking routine if the safety checking routine determines that the aircraft has entered the danger zone, or is on course to enter the danger zone.

2. The ATAAS of claim 1, wherein the identification value is representative of the 3-dimensional location of the location transmitter.

3. The ATAAS of claim 2, wherein the location transmitter comprises a one-time programmable memory, which is programmed to store the identification value.

4. The ATAAS of claim 3, wherein the location transmitter further comprises encryption means for encrypting the identification value prior to being transmitted.

5. The ATAAS of claim 1, wherein the location transmitter transmits standard aviation radio signals in all directions.

6. The ATAAS of claim 1, wherein the location transmitter is powered by a 110 Volt AC power supply, with a battery backup.

7. The ATAAS of claim 1, wherein the identification value comprises an internal identification tag that enables the safety checking routine to verify the identification value.

8. The ATAAS of claim 1, wherein the location transmitter has a transmission radius of no less than 20 nautical miles.

9. The ATAAS of claim 1, wherein the location transmitter is configured to transmit the identification value periodically.

10. The ATAAS of claim 1, wherein the danger zone is a three dimensional trapezoidal region around the location transmitter.

11. The ATAAS of claim 1, wherein the safety checking routine is configured to determine a safe path for the aircraft, and transmit the safe path to the autopilot, if the safety checking routine determines that the aircraft has entered the danger zone or is on course to enter the danger zone.

12. The ATAAS of claim 11, wherein the safe path is selected to automatically bring the aircraft to a predetermined safe altitude, while taking into account flight path information and environmental information.

13. The ATAAS of claim 1, wherein the password is randomly generated.

14. The ATAAS of claim 1, wherein the aircraft data processor includes an input device that enables the password to be entered to the aircraft data processor and provided to the safety checking routine, wherein the safety checking routine is configured to disengage the autopilot upon receiving the password.

15. The ATAAS of claim 1, wherein the aircraft further includes a terrain awareness and warning system (TAWS) or a collision avoidance system (CAS) configured to provide an alarm signal to the safety checking routine, wherein the safety checking routine is configured to determine a safe path for the aircraft, engage the autopilot, and transmit the safe path to the autopilot, when the safety checking routine receives the alarm signal.

16. The ATAAS of claim 1, wherein the aircraft further comprises a manual switch coupled to the aircraft data processor, wherein the manual switch is configured to activate a manual alarm signal when the manual switch is actuated, and wherein the safety checking routine is configured to determine a safe path for the aircraft, engage the autopilot, and transmit the safe path to the autopilot, when the manual alarm signal is activated.

17. The ATAAS of claim 16, wherein the manual switch is enabled at all times.

18. The ATAAS of claim 1, further comprising means for disabling the safety checking routine while the aircraft is taking off, enabling the safety checking routine after the aircraft has taken off, and disabling the safety checking routine when the aircraft begins descent.

19. A method of avoiding controlled flight into terrain (CFIT) accidents comprising:
transmitting an identification value from a location in a region to be protected from CFIT accidents;
receiving the identification value in an aircraft;
identifying a danger zone in the region in response to the identification value received by the aircraft;
determining whether the aircraft has entered the danger zone, or is on course to enter the danger zone;
providing a password upon determining that the aircraft has entered the danger zone, or is on course to enter the danger zone;
transmitting the password from the aircraft to an air route traffic control center (ARTCC); and
engaging an autopilot to control the aircraft upon determining that the aircraft has entered the danger zone, or is on course to enter the danger zone.

20. The method of claim 19, further comprising selecting the identification value to be representative of the 3-dimensional location of the location transmitter.

21. The method of claim 20, further comprising programming the identification value in a one-time programmable memory.

22. The method of claim 19, further comprising encrypting the identification value prior to being transmitted.

23. The method of claim 19, further comprising:
including an internal identification tag in the identification value; and
using the internal identification tag to verify the identification value on the aircraft.

24. The method of claim 19, further comprising defining the danger zone as a three dimensional trapezoidal region around the location.

25. The method of claim 19, further comprising:
determining a safe path for the aircraft upon determining that the aircraft has entered the danger zone or is on course to enter the danger zone; and then
transmitting the safe path to the autopilot, whereby the autopilot causes the aircraft to follow the safe path.

26. The method of claim 25, further comprising selecting the safe path to automatically bring the aircraft to a predetermined safe altitude, while taking into account flight path information and environmental information.

27. The method of claim 19, wherein the password is randomly generated.

28. The method of claim 19, further comprising:
transmitting the password from the ARTCC to the aircraft;
entering the password to an aircraft data processor on the aircraft; and
disengaging the autopilot when the password is entered in the aircraft data processor on the aircraft.

29. The method of claim 19, further comprising:
determining a safe path for the aircraft if a terrain awareness and warning system (TAWS) or a collision avoidance system (CAS) on the aircraft activates an alarm signal; and
engaging the autopilot if the alarm signal is activated, whereby the autopilot causes the aircraft to follow the safe path.

30. The method of claim 19, further comprising:
determining a safe path for the aircraft if a manual alarm switch on the aircraft is actuated; and
engaging the autopilot if the manual alarm switch on the aircraft is actuated, whereby the autopilot causes the aircraft to follow the safe path.

31. A software system for implementing automated terrain awareness and avoidance to avoid controlled flight into terrain (CFIT) accidents, the software system comprising:
operating software that is modularly upgradable into an existing aircraft and implements the following steps:
automatically rerouting control of the aircraft to an autopilot when the software system receives a trigger from an alerting system onboard the aircraft that indicates that the aircraft is in danger of CFIT;
automatically rerouting control of the aircraft to the autopilot when the software system makes calculations based on onboard data to determine that the aircraft is in danger of CFIT;
rerouting control of the aircraft to the autopilot if a manual switch in the aircraft is activated;
generating a password when control of the aircraft is rerouted to the autopilot;

transmitting the password to an air route traffic control center (ARTCC); and
relinquishing control of the autopilot only when:
- a signal from an alerting system onboard the aircraft indicates that the aircraft is no longer in danger of CFIT;
- the software system makes calculations based on onboard data to determine that the aircraft is no longer in danger of CFIT; or
- the password is entered into the software system.

* * * * *